Oct. 12, 1943.  E. T. CASELLINI  2,331,306
LUMINESCENT COATING FOR ELECTRIC LAMPS
Filed June 18, 1941
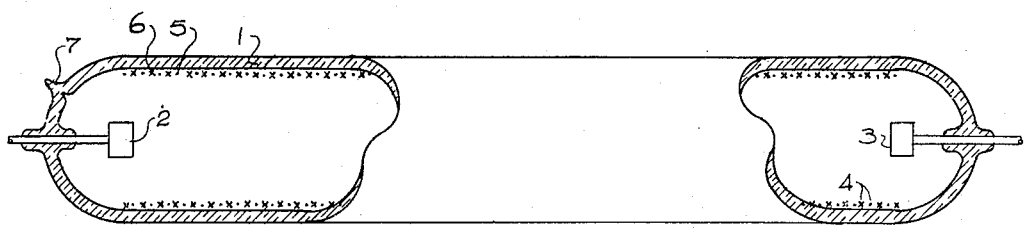
E. T. Casellini, INVENTOR.
BY Lawrence Burns,
ATTORNEY Patented Oct. 12, 1943

2,331,306

UNITED STATES PATENT OFFICE 2,331,306

LUMINESCENT COATING FOR ELECTRIC LAMPS

Ezio Thomas Casellini, Salem, Mass., assignor to Sylvania Electric Products Inc., a corporation of Massachusetts Application June 18, 1941, Serial No. 398,610

2 Claims. (Cl. 176—122)

The present invention relates to electric lamps and to fabricated glass articles generally, and more particularly to luminescent bulbs or tubes for electric lamps, and to methods of manufacture thereof.

An object of the present invention is to provide for such lamps a firmly-adherent, easily applied coating which is uniformly and brightly luminescent. A further object is to provide a luminescent coating which will adhere to the glass with undiminished power of luminescing even after the coated glass is heated and bent to a desired shape, and which will continue its adherence even when the glass tube is evacuated and then suddenly filled with air.

A feature of the invention is a luminescent coating in which the luminescent particles are held firmly in place by a porous backbone structure of essentially non-luminescent material. A particular feature is a luminescent coating containing a structure of aluminum oxide. A further feature is a method of treatment of a luminescent coating to produce the structure desired, and yet another feature is the application of a solution of aluminum nitrate to a luminescent coating, with subsequent heating to decompose the nitrate and form the porous binding structure of aluminum oxide.

Other objects and advantages of the invention will be apparent from the following description, taken in connection with the accompanying drawing, in which:

The single figure of the drawing is a profile view, partly in section of a lamp coated according to the invention.

In that figure, the lamp envelope 1, which may be a glass tube, has the electrodes 2, 3 sealed through it at each end, and a coating 4 of luminescent material on its interior surface. The coating 4 comprises the luminescent particles 5, held by the porous binding structure 6 of aluminum oxide. The envelope is sealed by the exhaust tubulation 7, and will generally contain an inert gas and a small quantity of mercury vapor. An electrical discharge may be produced between the electrodes 2 and 3, giving off ultraviolet light or other invisible radiation which will fall on the luminescent particles 5, causing them to give off visible light by fluorescence phosphorescence or the like. The word "luminescence" includes both fluorescence and phosphorescence.

Before being made into a lamp, the glass tubing should be coated with luminescent material. If desired, the tubing may have its interior surface frosted. The frosting, apparently by preventing internal reflections in the glass wall, will cause the luminescent coating to appear to be on the outside of the tube, although in reality it is on the inside. This will remove the "halo" effect of the non-luminescent thickness of glass around the coating, and will make the luminescent tube appear to be of larger diameter. Moreover, where the glass is heated for bending into the complicated patterns of the usual neon sign lamp, the interior surface generally will be roughened at the bend, because of the presence of the luminescent material, and the roughened or etched surface for the entire interior of the tube will prevent the bends from appearing different, that is of larger diameter, than the remainder of the tubing.

The entire length of tubing will look more uniform if frosted. The use of extremely small size luminescent particles, of about 0.1 micron maximum dimension, will achieve an effect similar to the frosting, but the frosted tubing gives the same effect with much larger particles, say of 10 microns dimension.

A solution of say, 2 grams of half-second viscosity nitrocellulose may be dissolved in 200 cc. of acetone, and have 400 grams of luminescent material, say zinc silicate, mixed with it.

This mixture may be poured through the interior of the glass tubing, which may be of the 15 mm. size useful for luminous signs, and allowed to dry. It will dry quickly, almost as quickly as it can be poured through the tubing, and the tubing should then be baked in air or oxygen at say 450° C. to decompose and remove the nitrocellulose. The tubing is then allowed to cool, and will have a porous coating of luminescent material, free from binder, on its inner surface.

The initial approximate drying of the tubing, or evaporation of the acetone, proceeds very quickly. If, however, the tubing is to be allowed to dry completely before baking, a plasticizer should be used in the coating solution to prevent the coating from peeling off the tube wall. The plasticize may be, for example, an organic phthalate or camphor, and may be present in the coating suspension to an amount about 40% of the weight of nitrocellulose used.

If the proportion of luminescent material to acetone is made higher, a good coating for my subsequent treatment may be obtained without using the nitrocellulose, and hence without baking to remove the nitrocellulose.

If the coating is baked below the softening temperature of the glass, the coating will tend to flake off when the tubing is heated for bending, while if the coating is baked to above the softening temperature of the glass to allow the luminescent particles to sink slightly into the glass for better adhesion, then the particles will sink further into the glass when heated for bending, and will thus lose their luminosity since the glass will not transmit much ultra-violet light or other exciting radiations. Moreover, if the glass tubing after baking, and without further treatment, is made into a lamp containing an inert gas at say, 10 mm. of mercury pressure, and then the tube is cracked or the exhaust tube broken, admitting air at atmospheric pressure, the coating will blow off the interior walls of the tube. That means, that if the lamp were a neon sign tube, bent to a complicated pattern, the coating would disappear from the tube walls whenever the tube developed a leak, or whenever the tubing was cut for repair purposes, such as adding new electrodes or repumping, or whenever the tubing was damaged by the handling necessary at installation. The whole tube would have to be made over again from newly coated tubing. This enormously adds to the expense of repair work on luminescent-coated sign lamps, since it means that an entire new lamp unit has to be made when only a small part of the unit is broken. This is now a serious problem in the industry.

I have found that by giving the coated tubing a simple treatment, I can secure such firm adherence of the coating to the tube walls that it will not blow off the walls when the exhausted lamp is suddenly exposed to atmospheric pressure. The same treatment also provides a coating which adheres to the tube walls during bending and retains its luminosity.

I take the coated tubing, pour through it, over the luminescent coating, an alcohol solution of aluminum nitrate, and then heat it. The alcohol will quickly evaporate away, drying the coating. The tubing should then be heated to approximately 120° C. for about 15 minutes, to decompose the aluminum nitrate, which will melt, giving off nitrogen dioxide gas and leaving an amorphous mass of aluminum oxide. The nitrogen dioxide will bubble through the melted nitrate, leaving a raised or swollen porous mass, like bread dough, for example; and when the decomposition is complete, there remains a porous binding residue of aluminum oxide holding the luminescent particles together. The luminescence of the treated tubing will not differ from that of the untreated tubing, but its adherence will be enormously greater. I have, for example, coated a tube with fluorescent material, dipped half of it in my treating solution, baked it and made the entire tube into a lamp. I have then allowed air at atmospheric pressure to enter the tube. All the untreated coating blew off, while the treated coating remained, leaving a sharp dividing line.

I have found the heating of the treated coating to be critical. For rapid heating, that is heating at too high a temperature, will cause the appearance of black spots in the tubing, reducing its luminosity, and prolonged rapid heating will turn the entire coating a brown color which subsequent heating will not remove. This browning may be due to the trapping of nitrogen dioxide in the coating, and is, of course, altogether different from the temporary browning, due to carbonization of the nitrocellulose, or the untreated tubing.

I heat the treated tubing, after drying, for about 15 minutes at approximately 120° C. to decompose the nitrate, and then heat it in air for about one minute at about 400° C. to remove any remaining traces of nitrate and to decompose any aluminum hydroxide or hydrated aluminum oxide.

The alcohol I use is ethyl alcohol denatured with acetone, but water or other suitable solvent may be used if desired. The aluminum nitrate used contained some water of crystallization and was not dehydrated prior to the treatment, so some nitric acid was given off when the nitrate decomposed. The aluminum nitrate used may be represented by the chemical formula $$Al(NO_3)_3.9H_2O,$$

and a 10% solution by weight in alcohol may be used, although the percentage solution used may be varied considerably. Such a high percentage may tend to make the tubing brittle at points where it is afterward heated and bent, the binding effect being so great that transverse fissures occur on the inside surface of the glass at the bend. I have found that a 3% solution will generally give good adherence without making the glass brittle at the bends. With the smaller particle sizes, even less may be used, but the exact amount for each case can be readily determined. Too much produces brittle bends; too little reduces the adherence.

My resultant coating is a porous structure in which the luminescent particles are held together firmly by an essentially non-luminescent material. Apparently the aluminum oxide deposits in very fine particles over each crystal, increasing the area of contact between crystals, and partially filling in the spaces between crystals, but not enough to diminish the porosity greatly. The adhesive force between particles is thus increased, which prevents blowing off of the coating, as already described, and also prevents "flaking off" of the coating in small pieces. The flaking is due to the mercury, generally used in fluorescent lamps, depositing in the coating to such an extent that the disruptive force exerted by the surface tension of the mercury is greater than the adhesive force between particles, whereupon the particles are forced apart.

The porosity will be sufficient to allow a light transmission of at least 50% through the coating, so that the light from the internal surface of the coating may be emitted from the lamp, and yet the adhesion will be sufficient to resist a shearing pressure of at least one atmosphere along the coating. Aluminum oxychloride can be used instead of the nitrate in following the invention.

The precautions which I have outlined to prevent browning of the coating are most important when the fluorescent material used in zinc beryllium silicate, less important when it is merely zinc silicate, and still less important when it is a tungstate.

In practicing the invention, magnesium nitrate or beryllium nitrate may be used instead of aluminum nitrate, in which case the binding structure in the coating will be of magnesium or beryllium oxide. I have treated tubing with magnesium and beryllium nitrate and found its power of luminescing unimpaired and its adherence increased. On the other hand, I have found that tubing treated with zinc nitrate diminished over 25% in luminescent light output and did not increase markedly in adherence. This was despite the fact that zinc is in the same group with aluminum of the periodic table of elements, while magnesium is in a different group. It is thus apparent from the foregoing that when I state in the appended claims that magnesium, beryllium, and aluminum compounds are in the same group, I do not mean the same group of the periodic table.

I have also found that a structure of boron oxide, which may be conveniently produced for example by flowing a water solution of boron oxide, or boric acid, over the luminescent coating, is extremely deleterious to the coating, causing a rapid deterioration of the luminescing power with life.

I have found that a mere mixture of some of the oxides mentioned with the luminescent material will not of itself provide firm adherence of the coating. The particles must be present in some form of binding structure, such as, produced by my novel treatment, which apparently deposits the oxide in amorphous form or in particle sizes much smaller than those of the luminescent coating and joins them into a binding structure.

This application is a continuation in part of my co-pending application Serial No. 270,792 filed April 29, 1939, issued September 16, 1941, U. S. Patent No. 2,255,761.

What I claim is:

1. In an electric discharge lamp, a sealed glass envelope bearing on its interior surface a firmly adherent coating, said coating comprising: a layer of luminescent particles only; and a porous layer-structure of a non-luminescent material, blanketing and binding together the particles of said luminescent layer; said non-luminescent material being of the following group: aluminum oxide, magnesium oxide, beryllium oxide; the contact of said binding structure being with surface particles only of said luminescent layer, and with only a portion of the surface of each of said contacted particles; and said binding structure having portions extending between said surface particles to at least partially fill spaces between said surface particles.

2. In an electric discharge lamp, a sealed glass envelope bearing on its interior surface a firmly adherent coating, said coating comprising: a layer of luminescent particles only; and a porous layer-structure of a non-luminescent material, blanketing and binding together the particles of said luminescent layer; said non-luminescent material being formed of particles much smaller than said luminescent particles, and being of the following group: aluminum oxide, magnesium oxide, beryllium oxide; the contact of said binding structure being with surface particles only of said luminescent layer, and with only a portion of the surface of each of said contacted particles; and said binding structure having portions extending between said surface particles to at least partially fill spaces between said surface particles.

EZIO THOMAS CASELLINI.